United States Patent
Otto

[15] 3,667,502
[45] June 6, 1972

[54] SELF-RECYCLING ACTUATOR AND VALVE INCORPORATING IT

[72] Inventor: Noel A. Otto, Whippany, N.J.

[73] Assignee: Automatic Switch Co.

[22] Filed: Mar. 19, 1970

[21] Appl. No.: 24,916

[52] U.S. Cl. ...................... 137/624.14, 91/52, 91/416
[51] Int. Cl. ......................... F16k 31/383, F16k 31/385
[58] Field of Search ............ 137/624.14, 469; 91/416, 417, 91/52

[56] References Cited

UNITED STATES PATENTS

| | | | |
|---|---|---|---|
| 3,083,721 | 4/1963 | Matthews | 137/624.14 X |
| 3,216,328 | 11/1965 | Peterson | 137/624.14 X |
| 3,509,901 | 5/1970 | Hollibaugh | 137/624.14 X |
| 3,083,732 | 4/1963 | Becker | 137/624.14 |
| 2,947,323 | 8/1960 | Becker | 137/624.14 |

*Primary Examiner*—Alan Cohan
*Attorney*—Breitenfeld & Levine

[57] ABSTRACT

A self-recycling actuator operated by a source of fluid pressure is used to control the operation of a valve. The valve has a main valve member whose position is controlled by a pilot valve adapted to vent the high pressure side of the main valve member. The self-recycling actuator controls the pilot valve and is operated by the high pressure fluid from the inlet of the main valve. High pressure fluid brought to the inlet of the self-recycling actuator displaces a plunger member thereby opening the pilot valve and hence the main valve. At the same time, high pressure fluid enters a recycling chamber. As pressure builds up in the recycling chamber, the plunger is returned to its initial position. Vent means reduces the pressure in the recycling chamber thereby initiating a new cycle.

9 Claims, 6 Drawing Figures

INVENTOR:
NOEL A. OTTO
BY Breitenfeld & Levine
ATTORNEYS

INVENTOR:
NOEL A. OTTO

INVENTOR:
NOEL A. OTTO
BY
Breitenfeld & Levine
ATTORNEYS

SELF-RECYCLING ACTUATOR AND VALVE INCORPORATING IT

This invention relates to a self-recycling actuator for use with a valve, and to a pilot operated valve incorporating the actuator. The invention is particularly useful in connection with pneumatic valves adapted to control air flow and be controlled by air pressure. However, it is to be understood that the actuator and valve have utility with fluids generally.

There are numerous installations including valves which must be operated periodically. Such cycling of the valves in ordinarily controlled by electric, pneumatic, or hydraulic timing devices.

It is an object of the present invention to provide a self-recycling actuator for a valve which accomplishes periodic cycling of the associated valve without the use of expensive and cumbersome timing equipment and associated wiring. Such a valve finds usefulness in a vast range of industrial applications, since the valve can be readily installed in fluid systems without requiring additional auxiliary equipment to control the cycling of the valve.

A feature of the invention involves the fact that the self-recycling actuator may be incorporated in a valve to provide a unitary self-recycling valve requiring only the continued presence of fluid pressure at the inlet of the valve to accomplish both the timing of the successive valve actuations, and the production of an actuating force to control the valve.

Another feature of the invention involves the fact that the recycling actuator can easily be adjusted to vary the cycle period of the valve from fractions of a second to many minutes.

Additional features and advantages of the invention will be apparent from the following description in which reference is made to the accompanying drawings:

Figure 1:
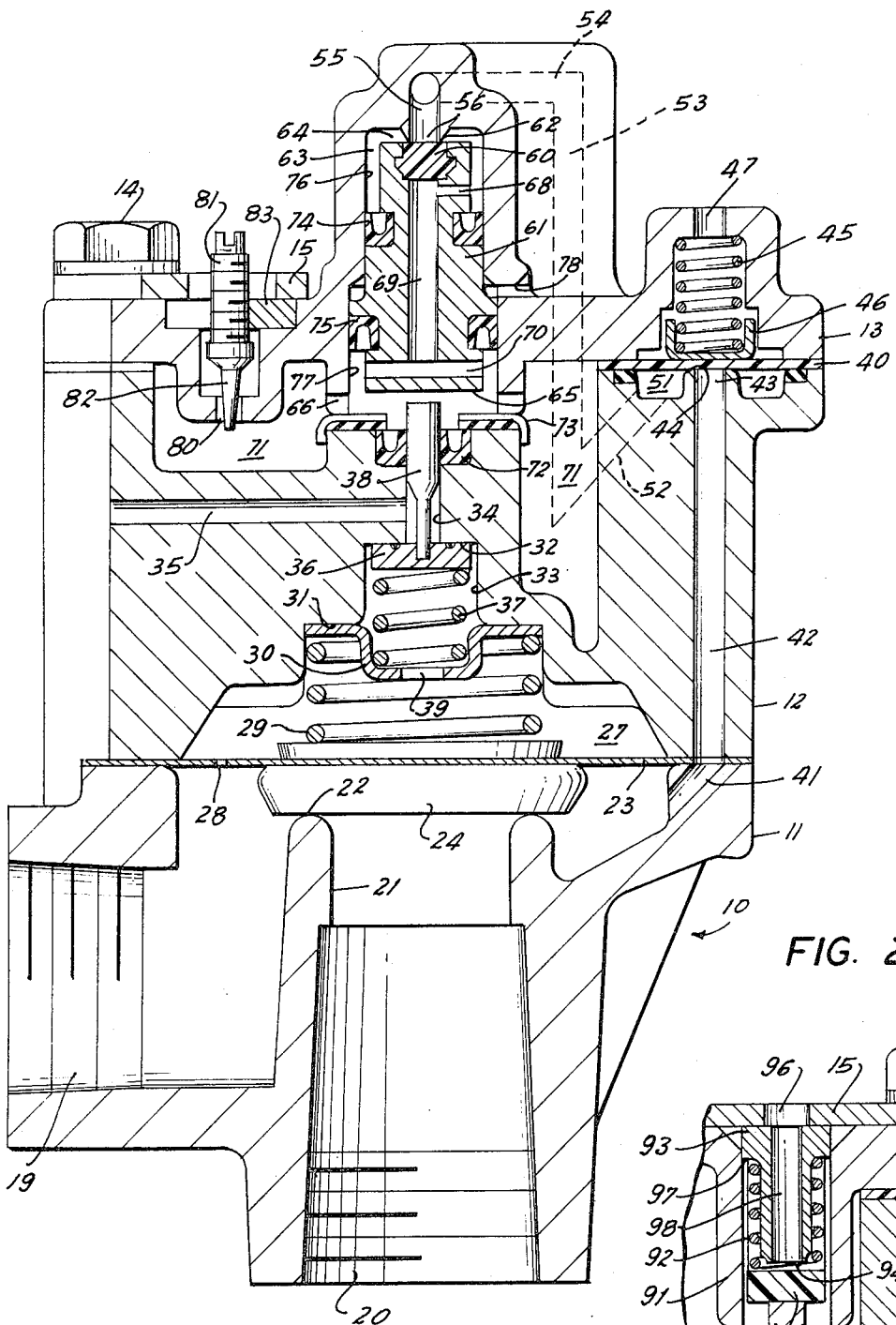
FIG. 1 is a longitudinal cross-sectional view of a valve according to this invention showing the main and pilot valves, and the self-recycling actuator, in closed position.

The valve 10 chosen to illustrate this invention and shown in FIGS. 1–4, includes a valve body comprising sections 11, and 12, and an end cap or actuator housing 13 all of which are fastened together by bolts 14 extending through all of the sections and threaded into main section 11. Bolts 14 also secure a retaining piece 15 to the top of end cap 13.

Body section 11 is formed with an inlet port 19, an outlet port 20, both adapted for connection to conduits, an orifice 21 between these two ports, and a valve seat 22 surrounding the orifice. A diaphragm 23 formed of a suitable flexible and resilient material, such as rubber, extends above the orifice 21, the margin of the diaphragm being sandwiched between the body sections 11 and 12. A main valve member 24 carried by the diaphragm 23 is movable into and out of engagement with the valve seat 22 to close and open the main valve, respectively.

Above diaphragm 23 is a chamber 27 communicating with the inlet port 19 via a small hole 28 in diaphragm 23. Within chamber 27 is a compression spring 29 seated at its lower end upon valve member 24, and at its upper end against the flange portion of a pilot valve spring seat member 30. Spring 29 presses the flange portion of member 30 against the top wall 31 of chamber 27. When chamber 27 is filled with fluid at the inlet pressure, the fluid force against the upper face of diaphragm 23 combined with the force of spring 29 keeps valve member 24 upon seat 22 and closes the main valve, as shown in FIG. 1. If the pressure in chamber 27 is relieved, the inlet pressure acting on the lower face of diaphragm 23 lifts the diaphragm and valve member (FIG. 3) and the main valve remains open as long as the pressure in chamber 27 remains relatively low.

The pressure in chamber 27 is controlled by a pilot valve, to be described now. A large bore 33 extends upwardly from the top wall 31 of chamber 27, and a smaller bore 34 extends upwardly from the top wall of bore 33. The area of the bore 33 top wall surrounding bore 34 serves as a pilot valve seat 32. A lateral bore 35 extends between bore 34, at a point above seat 32, and a vent opening at the exterior surface of body section 12, which opens into a low pressure region such as the atmosphere.

A pilot valve member 36 within bore 33 is movable toward and away from valve seat 32 to close and open the pilot valve, respectively, i.e., to prevent and establish, respectively, communication between chamber 27 and the vent opening at the outer end of bore 35, via hole 39 in member 30, and bores 33 and 34. Within bore 33 is a compression spring 37 seated at its upper end against pilot valve member 36 and at its lower end against member 30. A stem 38 is slidably arranged within bore 34, the upper end of the stem having a diameter slightly smaller than the diameter of bore 34, and the lower end of the stem having a reduced diameter to permit free communication through bore 34 between bore 33 and bore 35.

When chamber 27 is filled with fluid at the inlet pressure, the fluid force against the lower face of pilot valve 36 combined with the force of spring 37 keeps valve member 36 upon seat 32 and closes the pilot valve, as shown in FIG. 1. If stem 38 is shifted downwardly (FIG. 3), pilot valve member 36 is pushed away from seat 32, against the force of spring 37 and the fluid force, thereby opening the pilot valve, and allowing the fluid above diaphragm 23 to rush out of chamber 27 through bores 33, 34, and 35, thereby permitting the main valve member 24 to open.

The positioning of pilot valve stem 38 is controlled by the self-recycling actuator, to be described now. Passages 41 and 42 in valve body sections 11 and 12 respectively effect communication between inlet port 19 and an orifice 43 surrounded by a valve seat 44 formed at the top of valve body section 12. A diaphragm 40, the margin of which is sandwiched between body section 12 and end cap 13, is held against valve seat 44 by a compression spring 45. The lower end of spring 45 is seated within a cup 46 bearing against the upper face of diaphragm 40, and the region above diaphragm 40 is open to the atmosphere through hole 47.

When the pressure of the fluid in passage 42 exerts a force on diaphragm 40 great enough to overcome the force exerted by spring 45, diaphragm 40 is lifted off valve seat 44 (FIG. 3) and the fluid in passage 42 flows into annular region 51 and thence through passages 52, 53, 54 and 55, in the valve body section 12 and end cap 13, to the inlet orifice 56 of the actuator.

The pressure fluid entering through orifice 56 exerts a downward force on a valve disc 60 in the end of a plunger 61 sufficient to drive valve disc 60 off a valve seat 62 surrounding orifice 56. As a result, high pressure fluid enters the upper portion of a plunger chamber 63 defined by a bore 76 in end cap 13, and exerts a downward force, against the entire upper end surface 64 of plunger 61, serving to drive plunger 61 down until the lower surface 65 of the plunger contacts and displaces stem 38 (FIG. 3) thereby moving pilot valve member 36 away from valve seat 32. As a result, the pressure in chamber 27 is vented through lateral bore 35, thereby allowing the main valve member 24 to lift off valve seat 22 and open the valve.

At the same time that the inlet pressure fluid is exerting a force against upper surface 64 of plunger 61, the fluid in plunger chamber 63 passes through radial passage 68, axial passage 69, and radial passages 70 in plunger 61 into a recycling chamber 71. Recycling chamber 71 is defined by a bore 77 in end cap 13, below and larger than bore 76, and cavities in the upper surface of valve body section 12, these cavities and bore 77 communicating through openings 66 at the lower end of the wall of bore 77. Seal ring 72 held in place by retaining member 73 prevents leakage from recycling chamber 71 to chamber 27, around valve stem 38. Upper and lower seal rings 74 and 75 carried by plunger 61 prevent leakage from plunger chamber 63 and from recycling chamber 71. The portion of bore 77 between seal rings 74 and 75 is vented to the atmosphere by passage 78.

Figure 3:
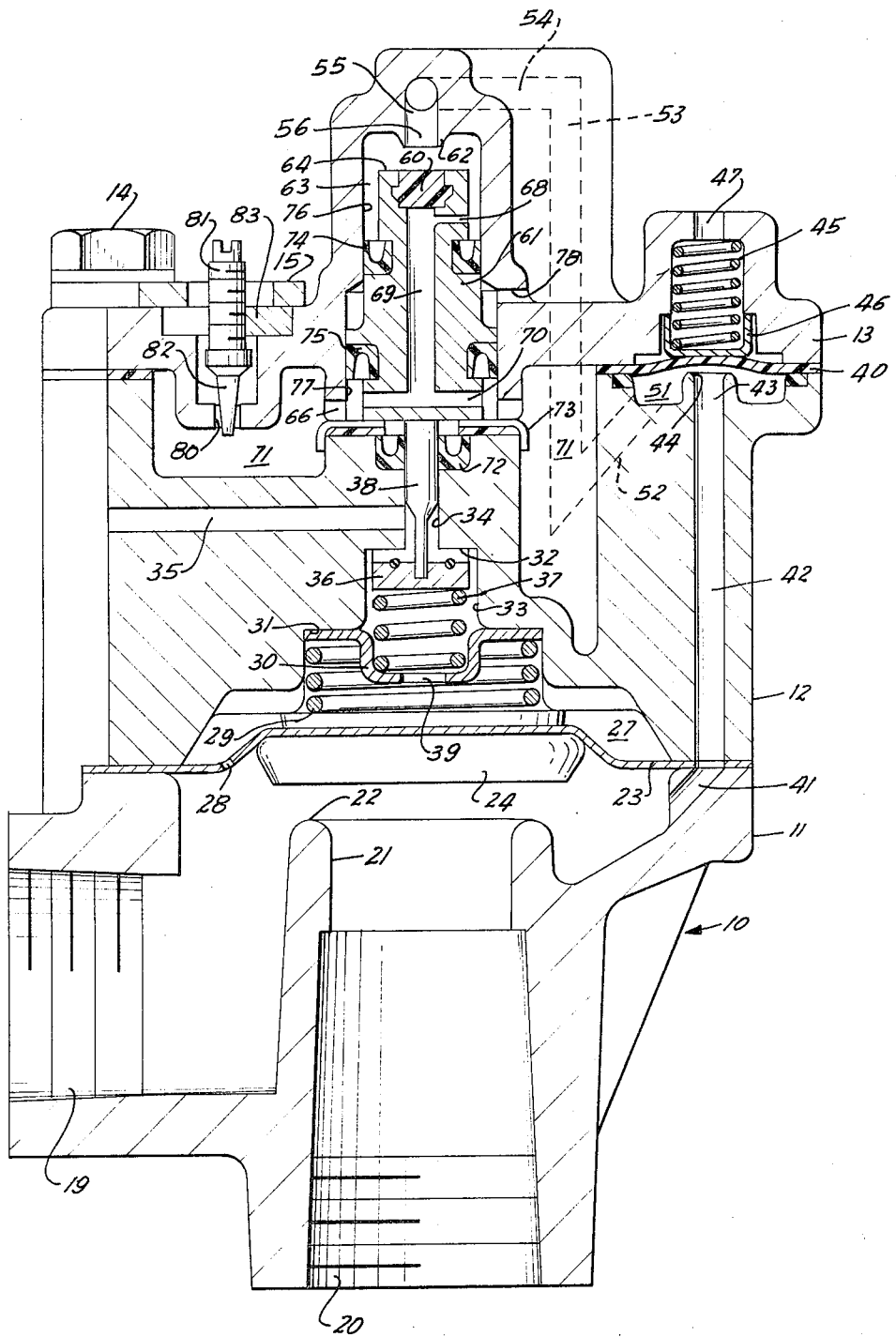
FIG. 3 is a view similar to FIG. 1, showing the main and pilot valves, and the self-recycling actuator in open position.
Figure 4:
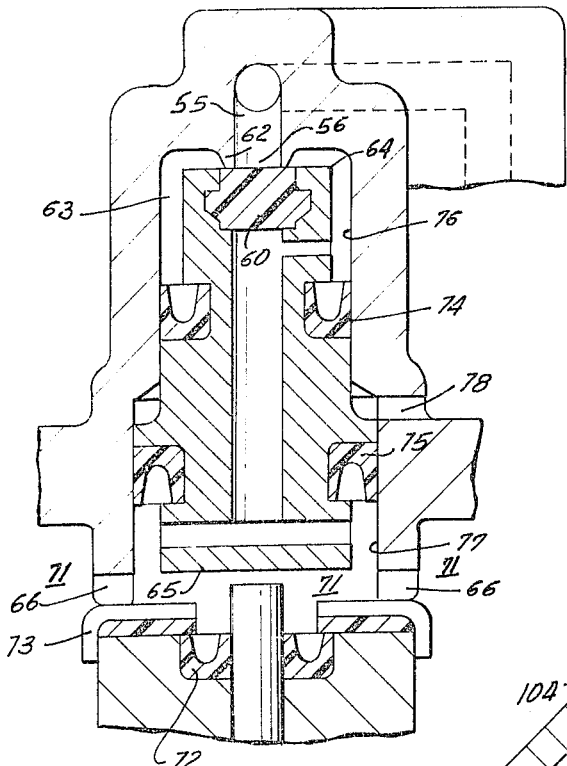
FIG. 4 is an enlarged cross-sectional view of the upper part of FIG. 1, showing the self-recycling actuator.

As can be easily seen in FIGS. 1, 3, and 4, the area of lower surface 65 of plunger 61 plus the area of the exposed lower surface of seal 75, is substantially larger than the area of upper end surface 64 of plunger 61 plus the area of the exposed upper surface of seal 74. Therefore, once the pressures in plunger chamber 63 and recycling chamber 71 have equalized, because of the flow through the plunger passageways 68, 69, and 70, there will be a net upward force exerted on the plunger 61 forcing it upwardly in the plunger chamber until the plunger disc 60 contacts the valve seat 62 thereby closing the plunger chamber 63 and preventing any more high pressure fluid from entering chambers 63 and 71.

Recycling chamber 71 is vented to the atmosphere through a bleed device in the top of end cap 13. A hole 80 in end cap 13 establishes communication between chamber 71 and the atmosphere. An adjustable stem 81, having a conical point 82 arranged in hole 80, is threadably positioned in a fixed nut 83. Rotation of stem 81 causes longitudinal movement of conical point 82 to vary the size of the flow path through hole 80, and therefore the rate at which the fluid in recycling chamber 71 is vented to the atmosphere.

As the venting through hole 80 takes place, the pressure in recycling chamber 71 drops until the force remaining in the recycling chamber 71 is insufficient to overcome the force of high pressure fluid exerted on valve disc 60 in the upper end of plunger 61. When this occurs, the force exerted by the pressure fluid in passage 55 again forces plunger 61 down a small distance sufficient to disengage valve disc 60 from valve seat 62 allowing the pressure fluid to reenter plunger chamber 63, thereby initiating a new cycle.

Figure 2:
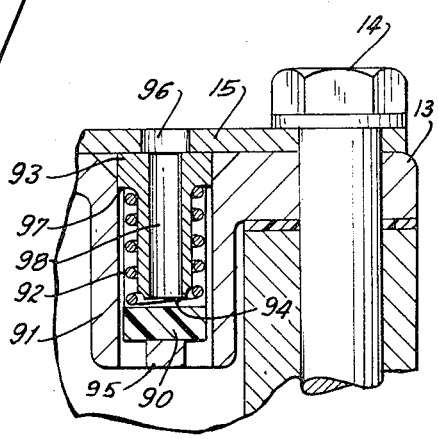
FIG. 2 is a fragmentary cross-sectional view of a portion of the self-recycling actuator looking in a direction opposite to the direction of viewing in FIG. 1.

In order to insure proper operation of the self-recycling actuator, it is desirable to provide a means by which the fluid in the recycling chamber 71 can at some predetermined pressure by quickly vented, to rapidly reduce the remaining pressure in the chamber and insure positive action of the plunger 61 in moving downward in plunger chamber 63 to open inlet orifice 56. To accomplish this purpose, a preset low pressure relief device, shown in FIG. 2, is carried by the end cap 13. A hollow cylindrical projection 91 extends downward into recycling chamber 71 from the lower surface of end cap 13. A hollow valve seat member 93, having a central passage 98, is located within projection 91, the lower end of member 93 defining a valve seat 94. A valve disc 90 is adapted to cooperate with valve seat 94 to close passage 98 though which recycling chamber 71 can otherwise communicate with the atmosphere. When the disc 90 is unseated, it rests upon an abutment 95 carried by projection 91. A compression spring 92 surrounds member 93, and is seated at its upper end against a shoulder 97 presented by member 93, and at its lower end against disc 90. Retaining piece 15 maintains member 93 within projection 91, and has a hole 96 aligned with passage 98.

When the pressure in recycling chamber 71 is high the upward force exerted on disc 90 is sufficient to overcome the bias of compression spring 92, whereby valve disc 90 is pressed against seat 94 thereby preventing any venting of recycling chamber 71 through passages 98 and 96. However, as the fluid in recycling chamber 71 is vented through the hole 80 of the adjustable bleed device, the force urging valve disc 90 against seat 94 decreases and at some point is no longer able to overcome the force exerted by the compression spring 92. As a result, the valve disc 90 is moved away from seat 94, by the spring, allowing a rapid venting of any of the pressure fluid remaining in the recycling chamber 71. Passage 98 is such a large opening to the atmosphere, as compared to bleed vent hole 80, that any leakage of high pressure fluid into recycling chamber 71 will not cause any significant build up of pressure, and hence downward movement of plunger 61 is assured.

Figure 5:
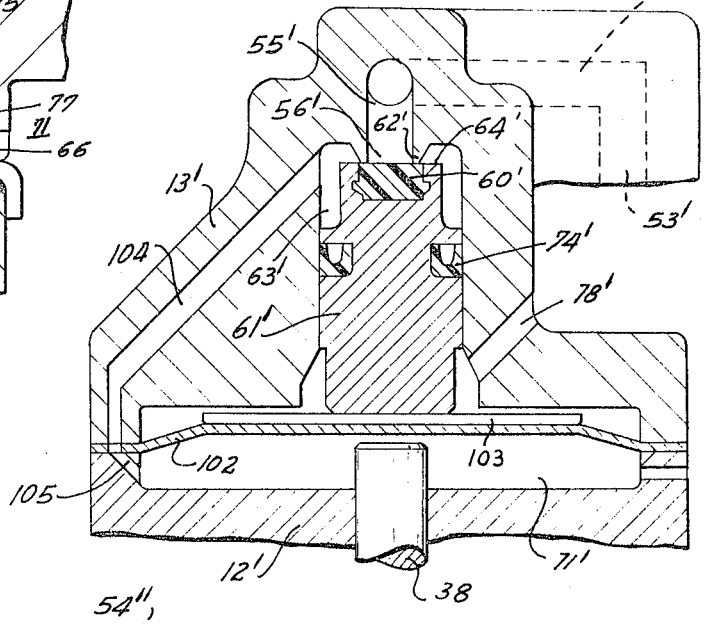
FIG. 5 is a cross-sectional view of another embodiment of a self-recycling actuator, according to this invention, employing a diaphragm.
Figure 6:
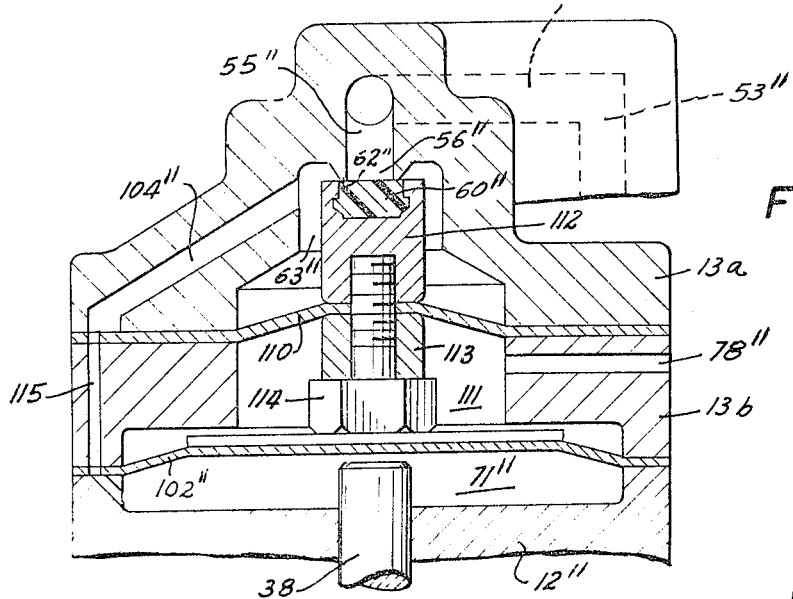
FIG. 6 is a cross-sectional view, of another embodiment of a self-recycling actuator, according to this invention, having two diaphragms.

FIGS. 5 and 6 show alternative embodiments of the self-recycling actuator. In the embodiment shown in FIG. 5, parts comparable to parts of FIG. 4 bear the same reference numerals followed by a prime. Passages 53 and 54 in housing 13' carry high pressure fluid to orifice 56'. The pressure fluid exerts a force against valve disc 60' which moves plunger 61' down a distance sufficient to disengage valve disc 60' from valve seat 62' to allow pressure fluid to enter plunger chamber 63' and exert a force on the entire upper surface 64' of the plunger to drive the latter downward. A diaphragm 102 is secured at its margins between body section 12 and cap 13'. A bearing plate 103 is secured to the center of diaphragm 102, and to the lower end of plunger 61'. Downward movement of the plunger therefore causes the diaphragm to push stem 38 downwardly.

Internal passages 104 and 105 in the housing 13' and body section 12', respectively, establish communication between plunger chamber 63' and recycling chamber 71'. Seal ring 74' and diaphragm 102 prevent leakage from plunger chamber 63' and recycling chamber 71', respectively to the space between the sealing devices, which is vented through passage 78'. Venting of recycling chamber 71' is accomplished by means not shown. Comparable to those described above with respect to FIGS. 1–4.

Except for the difference in the structure of the plunger and the passages through which the plunger chamber and the recycling chamber communicate, the embodiment of the recycling actuator shown in FIG. 5 functions identically with the embodiment shown in FIG. 4. The difference in the surface area between the lower surface of disphragm 102 and the upper surface 64' of plunger 61' produces a net force which tends to seat plunger disc 60' against seat 62' when the pressure in plunger chamber 63' and recycling chamber 71' are equal.

The embodiment of the self-recycling actuator shown in FIG. 6 is identical to that shown in FIG. 5 with the exception of the plunger construction and the sealing means used to prevent leakage from the plunger chamber and the recycling chamber. Parts comparable to parts of FIGS. 4 and 5 bear the same reference numerals followed by a double prime. The most significant difference between FIGS. 5 and 6 is diaphragm 110 used in place of seal 74' to prevent leakage from plunger chamber 63''. The region 111 between disphragms 110 and 102' is vented through passage 78''. Because of the use of the additional diaphragm the actuator housing is formed of two parts 13a and 13b which sandwich the margin of disphragm 110 between them. Additionally, because of the use of diaphragm 110, the plunger is fabricated in three parts. Upper part 112 and lower part 113 sandwich the diaphragm between them, and a bolt 114 secures parts 112 and 113 together. Passages 104'', 115, and 105'' carry the pressurized fluid from plunger chamber 63'' to recycling chamber 71''. Since the area of the bottom face of diaphragm 102'' is larger than the area of the top surfaces of plunger part 112 and diaphragm 110, plunger disc 60'' seats against seat 62'' when the pressures in chambers 63'' and 71'' are equal.

It will be appreciated that the period of each cycle of operation of the actuator, and hence the valve, can be adjusted by rotating stem 81 to reduce or enlarge the flow path through hole 80. Specifically, enlarging the flow path allows fluid in recycling chamber to vent more quickly and hence increases the number of cycles per unit time. Reducing the flow path reduces the number of cycles per unit time.

It should be pointed out, that the low pressure cut off valve including diaphragm 40, in the passage between the inlet port 19 and the inlet orifice 56 of the self-recycling actuator is not necessary for the functioning of the apparatus, nor is the rapid vent device for the recirculating chamber, shown in FIG. 2. The arrangement illustrated would be capable of operating effectively without either of these elements. Furthermore, although for simplicity the above description refers to various portions of the valve and actuator communicating with the atmosphere, it is to be understood that the atmosphere is intended to mean any relatively low pressure region.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A self-recycling actuator comprising:
   a. a housing having a plunger chamber and a recycling chamber,
   b. means establishing communication between said chambers,
   c. an inlet through which high pressure fluid may enter said plunger chamber,
   d. vent means through which fluid may leave said recycling chamber at a rate slower than the rate at which fluid enters said plunger chamber when said inlet is open,
   e. closure means movable within said plunger chamber for closing and opening said inlet, and
   f. means within said recycling chamber operatively associated with said closure means and responsive to fluid pressure in said recycling chamber of at least a certain minimum value for moving said closure means to a position in which the latter closes said inlet,
   whereby said means (f) causes said closure means (e) to maintain said inlet (c) closed until sufficient fluid bleeds out of said recycling chamber through vent means (d) to reduce the pressure in said recycling chamber enough to permit the high pressure fluid at said inlet (c) to move said closure means (e) and open said inlet thereby allowing high pressure fluid to once again fill said plunger and recycling chambers,
   said vent means (d) including low pressure relief means comprising an orifice communicating with said recycling chamber, a valve member operatively associated with said orifice to close said orifice in response to positive pressure in said recycling chamber, and biasing means to urge said valve member to the open position, whereby when the pressure in said recycling chamber drops below a predetermined value, the bias on said valve member opens said orifice and allows rapid venting of the pressure in said recycling chamber.

2. A self-recycling actuator as defined in claim 1 wherein said closure means (e) and means (f) form parts of a plunger extending between said plunger and recycling chambers, the end of said plunger located within said plunger chamber having a cross-sectional area smaller than the end of said plunger located within said recycling chamber.

3. A self-recycling actuator as defined in claim 1 wherein said means (f) includes a diaphragm, one face of said diaphragm being exposed to the pressure within said recycling chamber.

4. A self-recycling actuator as defined in claim 3 wherein said closure means (e) includes a plunger, one end of which is located within said plunger chambers, and the other end of which is operatively associated with the other face of said diaphragm.

5. A self-recycling actuator as defined in claim 3 wherein said closure means (e) includes a second diaphragm, one face of said second diaphragm being exposed to the pressure within said plunger chamber.

6. A valve comprising:
   g. a valve body having an inlet port, an outlet port, and an orifice between said ports surrounded by a valve seat,
   h. a main valve member movable into and out of engagement with said valve seat to close and open the valve, respectively,
   i. a chamber on the side of said valve member opposite said valve seat, said chamber communicating with said inlet port, whereby inlet pressure is applied to said opposite side of said valve member to keep the valve closed,
   j. a vent opening in said body,
   k. a pilot valve carried by said body establishing communication between said chamber and said vent opening, whereby when said pilot valve is opened the pressure in said chamber is released and the valve is permitted to open, and
   l. a self-recycling actuator as defined in claim 1, for controlling the operation of said pilot valve.

7. A valve as defined in claim 6 wherein said means (f) is operatively associated with said pilot valve (k) for opening the latter in response to movement of said closure means (e) in a direction which causes said inlet (c) to open.

8. A valve as defined in claim 7 including a part extending between said pilot valve (k) and said recycling chamber, said part transmitting movement of said means (f) to said pilot valve.

9. A self-recycling actuator comprising:
   a. a housing having a plunger chamber and a recycling chamber,
   b. means establishing communication between said chambers,
   c. an inlet through which high pressure fluid may enter said plunger chamber,
   d. vent means through which fluid may leave said recycling chamber at a rate slower than the rate at which fluid enters said plunger chamber when said inlet is open,
   e. closure means movable within said plunger chamber for closing and opening said inlet,
   f. means within said recycling chamber operatively associated with said closure means and responsive to fluid pressure in said recycling chamber of at least a certain minimum value for moving said closure means to a position in which the latter closes said inlet,
   whereby said means (f) causes said closure means (e) to maintain said inlet (c) closed until sufficient fluid bleeds out of said recycling chamber through vent means (d) to reduce the pressure in said recycling chamber enough to permit the high pressure fluid at said inlet (c) to move said closure means (e) and open said inlet thereby allowing high pressure fluid to once again fill said plunger and recycling chambers,
   g. conduit means for bringing high pressure fluid to said inlet, and
   h. valve means within said conduit means for closing the latter in the absence of a predetermined minimum pressure in said conduit means.

* * * * *